United States Patent [19]
Miller et al.

[11] Patent Number: 6,048,505
[45] Date of Patent: *Apr. 11, 2000

[54] CONTINUOUS NON-POLLUTING LIQUID PHASE TITANIUM DIOXIDE PROCESS AND APPARATUS

[75] Inventors: Jorge Miller, Bogota, Colombia; Brian Richard Davis, Houston, Tex.; Joseph Aloysius Rahm, Licking, Mo.; Eric James Madsen, Houston, Tex.

[73] Assignee: Kemicraft Overseas Limited, Douglas, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/917,941

[22] Filed: Aug. 22, 1997

Related U.S. Application Data

[63] Continuation of application No. 08/876,234, Jun. 16, 1997, abandoned.

[51] Int. Cl.[7] .............................. C01G 23/047; C09C 1/00
[52] U.S. Cl. .............................. 423/82; 423/610; 422/150
[58] Field of Search .............................. 423/610, 82, 616; 422/150

[56] References Cited

U.S. PATENT DOCUMENTS

| | | | |
|---|---|---|---|
| 2,774,650 | 12/1956 | Oppegaard | 423/82 |
| 3,981,978 | 9/1976 | Weiler et al. | 423/616 |
| 4,013,755 | 3/1977 | Weiler et al. | 423/82 |
| 4,038,363 | 7/1977 | Jarish | 423/610 |
| 4,288,416 | 9/1981 | Davis et al. | 423/82 |
| 4,288,418 | 9/1981 | Davis et al. | 423/82 |
| 4,505,886 | 3/1985 | Cody et al. | 423/82 |
| 4,552,730 | 11/1985 | Shirts et al. | 423/82 |
| 4,663,131 | 5/1987 | Gerken et al. | 423/82 |
| 4,986,742 | 1/1991 | Denecker et al. | 423/82 |
| 5,591,506 | 1/1997 | Miller et al. | 423/81 |
| 5,618,331 | 4/1997 | Miller et al. | 75/743 |

*Primary Examiner*—Steven Bos
*Attorney, Agent, or Firm*—Jacobson, Price, Holman & Stern, PLLC

[57] ABSTRACT

A non-polluting liquid-phase process and a supporting system of apparatus for producing titanium dioxide from titanium ore or slag provide a more economical sulfate process for preparing anatase. The ore or slag is reacted with hot sulfuric acid. The reaction product is filtered and washed before being combined with acid water, in which the solids are partially dissolved. The resulting suspension is filtered, and the filtrate hydrolyzed to convert titanium values therein to titanium dioxide hydrate, which is calcined to produce anatase pigment.

20 Claims, 1 Drawing Sheet

CONTINUOUS NON-POLLUTING LIQUID PHASE TITANIUM DIOXIDE PROCESS AND APPARATUS

RELATED APPLICATION

This application is a continuation of now abandoned application Ser. No. 08/876,234, filed Jun. 16, 1997, which is related to abandoned application Ser. No. 08/645,344, filed May 13, 1996, the entire disclosure of which is incorporated herein by reference.

BACKGROUND

There are two types of titanium dioxide pigments; both have a tetragonal crystal form. One crystal form is anatase (a soft crystal), and the other is rutile (a hard crystal).

Anatase, which comprises nearly half of the market, is used in the paper, textile fiber and plastic industries where a soft pigment will not wear away the cutting knives, extruders and injection equipment. The sulfate process is amenable to the manufacture of anatase pigments. The vapor phase chloride process is limited to the production of rutile. The prior process employing sulfates produced a large amount of pollution. Development of this new process eliminates most of the pollution.

For a better understanding of the invention, this sulfate process is described.

Drying and Grinding

Ilmenite ore or titanium slag (containing 1 to 5% humidity as received in a plant) is first dried to 0.3% humidity. It is then ground to from an average of 80 to 98% minus 200 mesh.

Digestion

A typical Ilmenite digestion reacted at 85% reaction acid is described as follows. 71,000 pounds of 66° Baumé sulfuric acid are charged into a reactor, and air agitation is started. 45,000 pounds of Ilmenite ground ore are slowly added (over 30 minutes), and then 6700 pounds of acceleration water are added. A reaction starts at from 95° to 105° C., and the temperature in the reactor rises rapidly from 120° to 200° C. with the evolution of 10,000 to 12,000 pounds of steam (with entrained acids), which is vented to the atmosphere, causing so-called acid rain, the reaction is often violent, emptying to the atmosphere with explosive force. When the reaction is complete, the resulting porous mass is allowed to cool, and water is added to dissolve soluble iron and titanium sulfates. Metallic iron is added to reduce any ferric sulfate formed, and the thus-obtained slurry (suspension) is pumped to settling tanks. This operation takes from about 12 to 24 hours.

Settling and Washing

Due to the presence of rutile in the ground ore, gangue minerals and colloids (mostly silica gel formed when digesting ore or slag) the suspension cannot be filtered directly, and it is pumped to settling tanks where the clear supernatant liquor and settled solids (mud) are obtained. The settled solids are again dispersed and washed counter-currently in a series of settling tanks to recover a maximum amount of titanium sulfate. The number of required tanks and their size take considerable land and entail significant cost.

Filtration

The combined clear settled liquors from the first settlers (together with leach liquor) are filtered and led to a vacuum evaporator (when using ilmenite ore) or directly to a hydrolysis process (when using slag, which contains less iron).

Evaporation under vacuum at temperatures below 60° C. is necessary to prevent premature hydrolysis. Copperas from a vacuum evaporator crystallizer is filtered, washed and dumped to sewage or sold.

A typical analysis of the concentrated filtered solution ready for hydrolysis is:

| Analyis | Typical Value |
| --- | --- |
| Sp. Gr. | 1.620 at 60° C. |
| % $TiO_2$ | 15.4 |
| % $FeSO_4$ | 10.8 |
| % $H_2SO_4$ | 27.7 |

Hydrolysis

The solution is then heated to a temperature of 96° C., and hydrolysis is started by pumping part of the liquor into 96° C. hot water (about ¼ of the liquor volume) over a period of 16 minutes. The mixture is then brought to a boil (102° C. to 108° C.). Boiling is continued until about 96% of the titanium is recovered.

The resulting suspension is led to a series of counter-current filter arrangements (e.g., Moore filters), in which the titanium hydrate is separated and washed. The resulting solution (containing weak sulfuric acid) is discharged to sewage.

The preceding process causes significant pollution, which is the reason why it is being abolished in all industrialized countries.

SUMMARY OF THE INVENTION

A prime purpose of the present invention is to use a series of novel steps which prevent pollution and establish a more economical sulfate process which can produce anatase (required in the paper, textile fiber, and plastic industries) and rutile (for paints, etc.).

An object of the invention is to eliminate acid rain, overflow of effluent to water ways and injection of effluents into the ground. Another object is conservation of water. A further object is efficient heat balance management. Still further objects are apparent from the following description.

The process does not require drying or grinding ore or slag, thus eliminating costly equipment and labor. Unground wet ilmenite ore as delivered, containing from 1 to 5% $H_2O$, or titanium slag is continuously fed to a reactor with from 65 to 85% hot sulfuric acid (121° C. to 200° C.) in sufficient quantity to keep the resulting slurry liquid (3 to 8/1 sulfuric acid to ore ratio, depending on acid concentration, which can oscillate between 65% and 85%). The reaction is very rapid, breaking large particles into a fine suspension, and agitation is provided either mechanically or with air spargers. The reactor is made of sufficient size so that retention time (which is in the order of from 2 to 8 hours) of the ore or slag and acid is sufficient to digest 90% of the $TiO_2$.

The reacted slurry is then continuously fed to a vacuum filter instead of the first spray dryer as depicted in antecedent patent application Ser. No. 08/645,344, now abandoned (Filtration produces about a 4 to 1 acid to $TiO_2$ ratio. As a result a spray drying technique was previously developed to evaporate the excess acid back to a 2/1 acid to $TiO_2$ ratio).

The use of a water wash to remove the excess acid was not generally considered because the titanyl cake is water soluble. However, it has been found that dissolution of titanyl sulfate is not rapid and a displacement wash of water (slightly acidified) does in fact remove excess acid without removing much titanium dioxide. This has now become the preferred process, and one of the advantages is that the displacement wash yields strong acid which can be recycled back to the reactor.

Acid strength can be from 55 to 85%; 65% is preferred because it has a minimum solubility of salts. When iron is left in the oxidized state, it appears to be removed to some extent from the raw cake by the washing procedure.

The ability to recycle acid directly back to the reactor makes it possible to decouple the spray drier for the Moore acid recycle from the reactor loop, and it is only used to concentrate dilute 25% acid.

The acid from the Moore filter and the above slurry wash contains all the iron sulfate coming from the system. Since ferrous sulfate is insoluble in concentrated sulfuric acid, it is removed by filtration after being concentrated by evaporation in the sole spray drier, and the acid is re-circulated to the reactor. The gases from the reactor and from the sole spray drier (containing mostly water vapor and some acid) are condensed and used to wash the cake. In this manner more than 97% of the acid is recovered at this point.

The cake (containing titanyl sulfate, ferrous sulfate, ferric sulfate and insolubilized colloids) from the reactor filter is partially dissolved in acid water from condensers, taking care not to exceed a temperature of 60° C., preventing premature hydrolysis. Reducing agent is added to reduce the iron to the 2 valent state and to put 3 grams per liter of the titanium to the 3 valent state. The resulting suspension is then filtered in a rotary filter with pre-coat and filter aid. The obtained filter cake is washed and discarded after proper neutralization.

Obtained filtrate is then conducted to a hydrolysis department, where it is hydrolyzed, without first removing copperas (ferrous sulfate), to produce titanium oxide hydrate. The resulting suspension is filtered to obtain filter cake. The washed filter cake (titanium dioxide hydrate) is chemically treated with a precalcination addition of chemicals and calcined in a fluidized calciner at a temperature around 925° C. to 980° C. to form anatase, which is cooled, ground and packed. Hot gases from the fluidizer, containing sulfuric acid and some titanium dioxide, are recycled to the sole spray dryer, which absorbs the acid and any $SO_3$ formed and evaporates the water. (Note that the sole spray dryer is really an evaporator).

There are a number of distinct aspects to the subject invention, each of which comprises process steps or equipment supporting such steps. Several of the aspects (in process terms) are as follows:

a) reacting titanium ore or slag with hot sulfuric acid, separating out filter cake of titanyl sulfate from the resulting reaction product, combining the cake with acid water to form a partially dissolved product as a suspension, filtering the suspension, hydrolyzing the thus-obtained filtrate to convert titanium dioxide hydrate, and calcining the titanium dioxide hydrate to obtain anatase pigment;

b) using hot gases from the calcining means to evaporate the solutions obtained from the reaction of titanium ore or slag with hot sulfuric acid from hydrolysis;

c) recycling hot gases (containing sulfuric acid) from the calcine and wash water from titanium dioxide hydrate filtering means to spray dryer means for producing ferrous sulfate monohydrate and for producing acid water for partially dissolving free-flowing solids from the reaction product of titanium ore or slag with hot sulfuric acid; and d) recycling filtrate (hot concentrated sulfuric acid) from ferrous sulfate monohydrate filtering means to the reactor means for reacting titanium ore or slag with hot sulfuric acid.

DETAILS

Figure 1:
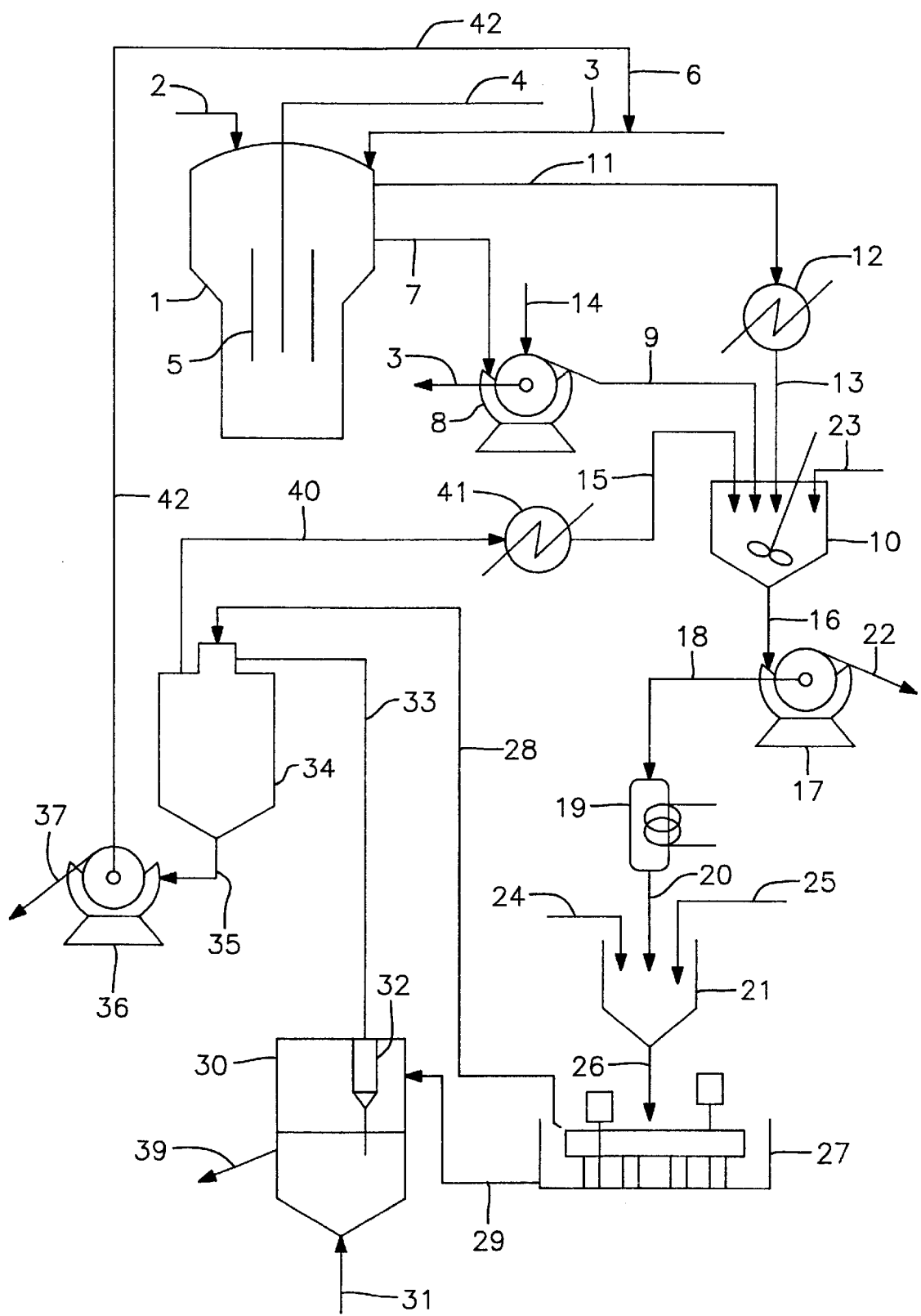
FIG. 1 is a schematic presentation of the process and equipment suitable for the invention.

Raw material, e.g., pre-oxidized slag or Ilmenite, is fed through line (2) to reactor (1). Hot gas is fed through line (4) to provide agitation by means of a Pachuca tube (5). Acid is fed through line (3) with make up acid from line (6). Together with recovered acid from the spray evaporator (34), reacted product (containing titanyl sulfate, iron sulfate and other sulfates) overflows from reactor (1) through line (7) to rotary filter (8). Obtained filter cake is given a displacement wash on rotary filter (8), whose water comes in through line (14). The washed filter cake is delivered through line (9) to dissolving tank (10) Concentrated acid from rotary filter (8), together with displacement wash, is returned to reactor (1) through line (3), which also receives make-up concentrated acid through line (6). Steam, together with some acid formed during reaction in reactor (1), is led through line (11) to condenser (12), and from condenser (12) through line (13) to dissolving tank (10). Additional water containing acid from condenser (41) is led through line (15) to dissolving tank (10). Reducing material (iron, aluminum) added to dissolving tank (10), together with insoluble materials, is conducted through line (16) to filter (17). Clear filtrate from filter (17) is led through line (18) to pre-heater (19), and from pre-heater (19) through line (20) to hydrolysis tank (21). Unreacted ore and insoluble material is delivered from filter (17) through line (22) to waste. Hot liquor from pre-heater (19) is then introduced through line (20) to hydrolysis tank (21), in which it reacts with hot water from line (24), which has been previously introduced to seed and start hydrolysis. The resulting mixture is then brought to a boil, using live steam transmitted through line (25). After hydrolysis, the obtained titanium dioxide hydrate flows through line (26) to Moore filters (27). Filter cake from Moore filters (27) is delivered through line (29) to fluid bed calciner (30), where it meets hot gases from line (31). Calcined titanium dioxide is delivered through line (39) to coolers, packing, and grinding, not shown. Gases flow from cyclone (32) through line (33) to spray drier (34) through line (35) to filter (36). Insoluble ferrous sulfate monohydrate from filter (36) is delivered through line (37) to washing, drying and packing, not shown. Concentrated acid is led through line (42) to line (3) and thus delivered back to reactor (1). Steam {with some acid from spray drier (34)} is led through line (40) to condenser (41). Water {with some acid from condenser (41)} is led to dissolving tank (10) through line (15).

EXAMPLE

Beach sand and 65% sulfuric acid are added into a reactor with an acid to ore ratio of from 5:1 to 7:1.

The resulting admixture is heated to 180° C. and agitated for 8 hours.

The reacted ore slurry is discharged into a filter, and a vacuum of −28 mm Hg is pulled to separate excess fluid. The filtrate is 57.3% acid, 7.8% $Fe_2(SO_4)_3$, 0.4% $TiO_2$.

Thus-obtained filter cake is washed with 2% acidified water. The filtrate contains 40.65% acid, 1.79% $TiO_2$ and 9.1% $Fe(SO_4)_3$.

The cake contains 16.2% $TiO_2$, 12.7% $Fe_2(SO_4)_3$ and 33% acid, giving a 2.0 to 1.0 acid to $TiO_2$ ratio.

Acidified water (4% acid) is added to the cake to dissolve it. Aluminum powder is added to reduce the resulting solution and produce 2 grams per liter of reduced $TiO_2$. The solution is heated to 50° C. to promote the dissolving.

Insoluble solids are separated from the thus-obtained product by means of a filter, washed and dumped.

The filtrate contains 14.3% $TiO_2$, 4.4% $FeSO_4$, and 26.5% sulfuric acid, giving a 1.9 acid to $TiO_2$ ratio.

The solution (filtrate) and a weighed amount of water are preheated. The resulting hot solution is fed into hot water in the hydrolysis tank. The mixture is brought to a boil. After hydrolysis the obtained $TiO_2$ hydrate is filtered and washed.

The obtained filter cake is treated for calcination and calcined at from 925° C. to 980° C. to obtain the desired pigment quality.

The invention and its advantages are readily understood from the foregoing description. It is apparent that various changes may be made in the process and apparatus without departing from the spirit and scope of the invention or sacrificing its material advantages. The process and apparatus hereinbefore described are merely illustrative of preferred embodiments of the invention.

What is claimed is:

1. A non-polluting liquid-phase process for producing titanium dioxide pigment from titanium ore or slag which comprises the following steps:
    a) reacting the ore or slag with sufficient sulfuric acid to obtain a liquid slurry reaction product,
    b) filtering the reaction product to obtain a filter cake,
    c) wash-filtering the filter cake with wash water to obtain a further filter cake and filtrate comprising used wash water,
    d) recycling the filtrate to step (a),
    e) separating out and recovering, in aqueous solution, water-soluble components of the further filter cake,
    f) subjecting the water-soluble components, in solution, to hydrolysis to convert titanium values therein to titanium dioxide hydrate,
    g) calcining the titanium dioxide hydrate to obtain titanium dioxide pigment, and, optionally recycling concentrated sulfuric acid emanating from step (g) to step (a).

2. A process of claim 1 wherein step (c) comprises
    h) dissolving in water water-soluble components of the filter cake obtained in step (b), and the process further comprises:
    i) filtering the product of step (c) to obtain a clear filtrate,
    j) hydrolyzing the clear filtrate to obtain titanium dioxide hydrate,
    k) filtering the product of step (i) to obtain a further filter cake, and
    l) calcining the further filter cake to obtain calcined titanium dioxide.

3. A process of claim 1 for converting titanium ore or slag to anatase pigment, which process is a continuous process comprising the following steps:
    1) reacting the ore or slag with from 55 to 85% sulfuric acid to obtain, as a reaction product, titanyl sulfate, iron sulfate and other sulfates,
    2) filtering and washing the reaction product to obtain a washed filter cake, filtrate and used wash water,
    3) recycling the filtrate and used wash water to step (1),
    4) dissolving in water water-soluble components, comprising titanyl sulfate, iron sulfate and other water-soluble sulfates, of the washed filter cake,
    5) filtering the product of step (4) to obtain a clear filtrate,
    6) hydrolyzing the clear filtrate to obtain titanium dioxide hydrate, and
    7) calcining the titanium dioxide hydrate to obtain titanium dioxide pigment.

4. A process of claim 1 which is a continuous process wherein the produced titanium dioxide pigment is anatase pigment, and wherein the reaction product of step (a) comprises titanyl sulfate, iron sulfate and other sulfates; step (d) comprises recycling the filtrate and used wash water to step (a); the water-soluble components of step (e) comprise titanyl sulfate, iron sulfate and other water-soluble sulfates, all of which are dissolved in water in that step.

5. A process of claim 4 wherein titanium ore is reacted in step (+2).

6. A process of claim 5 wherein the titanium ore is ilmenite.

7. A process of claim 4 wherein preoxidized titanium slag is reacted in step (+2).

8. A process of claim 1 for converting titanium ore or slag to anatase pigment which comprises the following steps:
    1) reacting the titanium ore or slag with excess concentrated sulfuric acid, under agitation, to obtain a reaction product comprising titanyl sulfate, iron sulfate and other sulfates,
    2) filtering the reaction product to obtain filter cake and filtrate,
    3) washing the filter cake with wash water to obtain washed filter cake and used wash water,
    4) recycling the filtrate and the used wash water to step (1),
    5) dissolving in water water-soluble components, including titanium values of the washed filter cake, the resulting aqueous solution further comprising, undissolved, insoluble material,
    6) separating the aqueous solution from the insoluble material,
    7) hydrolyzing dissolved titanium values in the aqueous solution to obtain titanium dioxide hydrate,
    8) filtering obtained titanium dioxide hydrate from filtrate, which contains acid and ferrous sulfate monohydrate,
    9) calcining the titanium dioxide hydrate to convert it to anatase pigment,
    10) conducting heat and gas from step (9) to step (11),
    11) spray-drying the filtrate, which contains acid and ferrous sulfate monohydrate, to obtain concentrated acid, insoluble ferrous sulfate monohydrate and steam,
    12) recycling the concentrated acid to step (1),
    13) recycling the steam, containing some acid, to step (3), and
    14) conducting steam and some acid produced in step (1) to step (3).

9. A process of claim 1 wherein the produced titanium dioxide pigment is anatase pigment, the sufficient sulfuric acid in step (a) is in excess of the stoichiometric amount of concentrated sulfuric acid, the reaction is effected under agitation, and the reaction product comprises titanyl sulfate, iron sulfate and other sulfates; step (b) produces both filter cake and filtrate; step (d) comprises recycling the filtrate and the used wash water to step (a); step (e) comprises dissolving in water the water-soluble components, including titanium values of the washed filter cake, the resulting aqueous solution further comprising, undissolved, insoluble material; the aqueous solution is then separated from the insoluble material; the titanium dioxide hydrate obtained from step (f) is filtered from filtrate, which contains acid and ferrous sulfate monohydrate; step (g) converts the titanium dioxide hydrate to anatase pigment; subsequently spray-drying the filtrate, which contains acid and ferrous sulfate monohydrate, to obtain concentrated acid, insoluble ferrous sulfate monohydrate and steam; conducting heat and gas from step (g) to the spray drying; and conducting steam and some acid produced in step (a) to step (c).

10. A process of claim 1 wherein the sulfuric acid in step (a) is at a temperature of from 121° to 200° C.

11. A process of claim 1 wherein the ore or slag in step (a) is iron-containing ore or slag.

12. A process of claim 1 which is a continuous process, in step (a) of which the sulfuric acid is at an acid strength of from 55% to 85%, the ratio of acid to ore or slag is from 5:1 to 8:1, and prior grinding of the ore or slag is not required.

13. A process of claim 1 wherein the titanium ore is ilmenite.

14. A non-polluting liquid-phase process for producing titanium dioxide pigment from titanium ore or slag which comprises the following steps:
   a) reacting titanium ore or slag with sufficient hot sulfuric acid to obtain a liquid slurry reaction product,
   b) filtering the reaction product to separate filter cake of titanyl sulfate from the reaction product,
   c) combining the filter cake with acid water to form a partially-dissolved product as a suspension,
   d) filtering the suspension to obtain filtrate thereof,
   e) hydrolyzing the filtrate to convert titanium values therein to titanium dioxide hydrate, and
   f) calcining the titanium dioxide hydrate to obtain hot gases and anatase pigment.

15. A process of claim 14 which comprises filtering the product of step (e) to obtain a further filtrate and filter cake, and using the hot gases (containing sulfuric acid) from step (f) to evaporate liquid from the further filtrate.

16. A process of claim 15 which comprises washing the further filter cake to obtain washed filter cake and used wash water, recycling the hot gases from step (f) and used wash water to spray dryer means for producing ferrous sulfate monohydrate and acid water, and using the acid water in step (c).

17. A process of claim 16 which comprises filtering the ferrous sulfate monohydrate from the acid water to obtain hot concentrated sulfuric acid filtrate, and recycling the hot concentrated sulfuric acid filtrate to step (a).

18. Apparatus for converting titanium ore or slag to anatase pigment, which apparatus comprises:
   a) reactor means to react the titanium ore or slag with sulfuric acid and to obtain a reaction product comprising titanyl sulfate, iron sulfate and other sulfates,
   b) means to introduce the ore or slag into the reactor means;
   c) means to introduce the sulfuric acid into the reactor means,
   d) means to agitate reacting components within the reactor means,
   e) first filter means to obtain filter cake and filtrate from the reaction product,
   f) means to conduct the reaction product from the reactor means to the first filter means;
   g) means to wash the filter cake with wash water and to obtain washed filter cake and used wash water,
   h) means to recycle filtrate from first filter means (e) and the used wash water to reactor means (a),
   i) dissolving tank means to place in aqueous solution water-soluble components, including titanium values, of the washed filter cake, the aqueous solution further comprising, undissolved, insoluble material,
   j) means to conduct the washed filter cake to the dissolving tank means,
   k) means to conduct water to the dissolving tank means,
   l) first separator means to separate the aqueous solution from the insoluble material obtained from the dissolving tank means,
   m) hydrolysis tank means to hydrolyze dissolved titanium values in said last-noted aqueous solution to obtain titanium dioxide hydrate,
   n) means to conduct the aqueous solution, free from insoluble material, from the first separator means to the hydrolysis tank means,
   o) second filter means to separate obtained titanium dioxide hydrate from filtrate,
   p) means to conduct product from the hydrolysis tank means to the second filter means,
   q) calciner means to convert the titanium dioxide hydrate to anatase pigment, and
   r) means to conduct titanium dioxide hydrate from the second filter means to the calciner means.

19. Apparatus of claim 18 further comprising:
   s) spray-drier means,
   t) means to conduct gas from the calciner means to the spray-drier means,
   u) means to conduct filtrate from the second filter means to the spray-drier means,
   v) second separator means,
   w) means to conduct concentrated acid containing ferrous sulfate monohydrate to the second separator means,
   x) means to withdraw insoluble ferrous sulfate monohydrate from the second separator means, and
   y) means to conduct concentrated acid from the second separator means to reactor means (a).

20. Apparatus according to claim 19 wherein means (k) comprises means to conduct steam together with some acid formed in reactor means (a) and means to conduct steam and some acid from spray-drier means (s) to the dissolving tank means.

* * * * *

UNITED STATES PATENT AND TRADEMARK OFFICE
CERTIFICATE OF CORRECTION

PATENT NO. : 6,048,505
DATED : April 11, 2000
INVENTOR(S) : Jorge Miller et al.

Page 1 of 1

It is certified that error appears in the above-identified patent and that said Letters Patent is hereby corrected as shown below:

Column 3,
Line 35, "fluidized calciner" should read -- calciner --;
Line 37, "fluidizer" should read -- calciner --.

Column 6,
Line 18, "preoxidized titanium slag" should read -- titanium slag --.

Signed and Sealed this

Fourteenth Day of August, 2001

*Attest:*

Nicholas P. Godici

NICHOLAS P. GODICI
*Attesting Officer*    *Acting Director of the United States Patent and Trademark Office*